March 7, 1944.　　　　E. R. SIMONKA　　　　2,343,482
TRACTOR OPERATED DISK-HARROW
Filed June 22, 1942　　　3 Sheets-Sheet 1
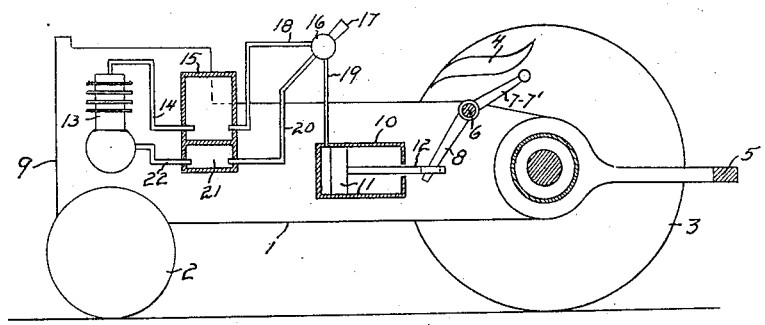
Fig. 1
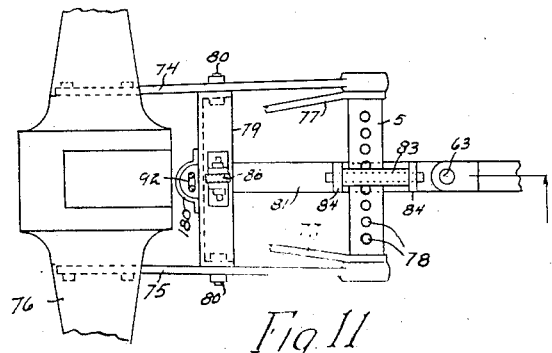
Fig. 11
Fig. 8
Fig. 9
Fig. 10
Fig. 12
Inventor
Eugene R. Simonka
By Harry R. Canfield
Attorney March 7, 1944.　　　E. R. SIMONKA　　　2,343,482
TRACTOR OPERATED DISK-HARROW
Filed June 22, 1942　　　3 Sheets-Sheet 2

Inventor
Eugene R. Simonka
By Harry P. Canfield
Attorney

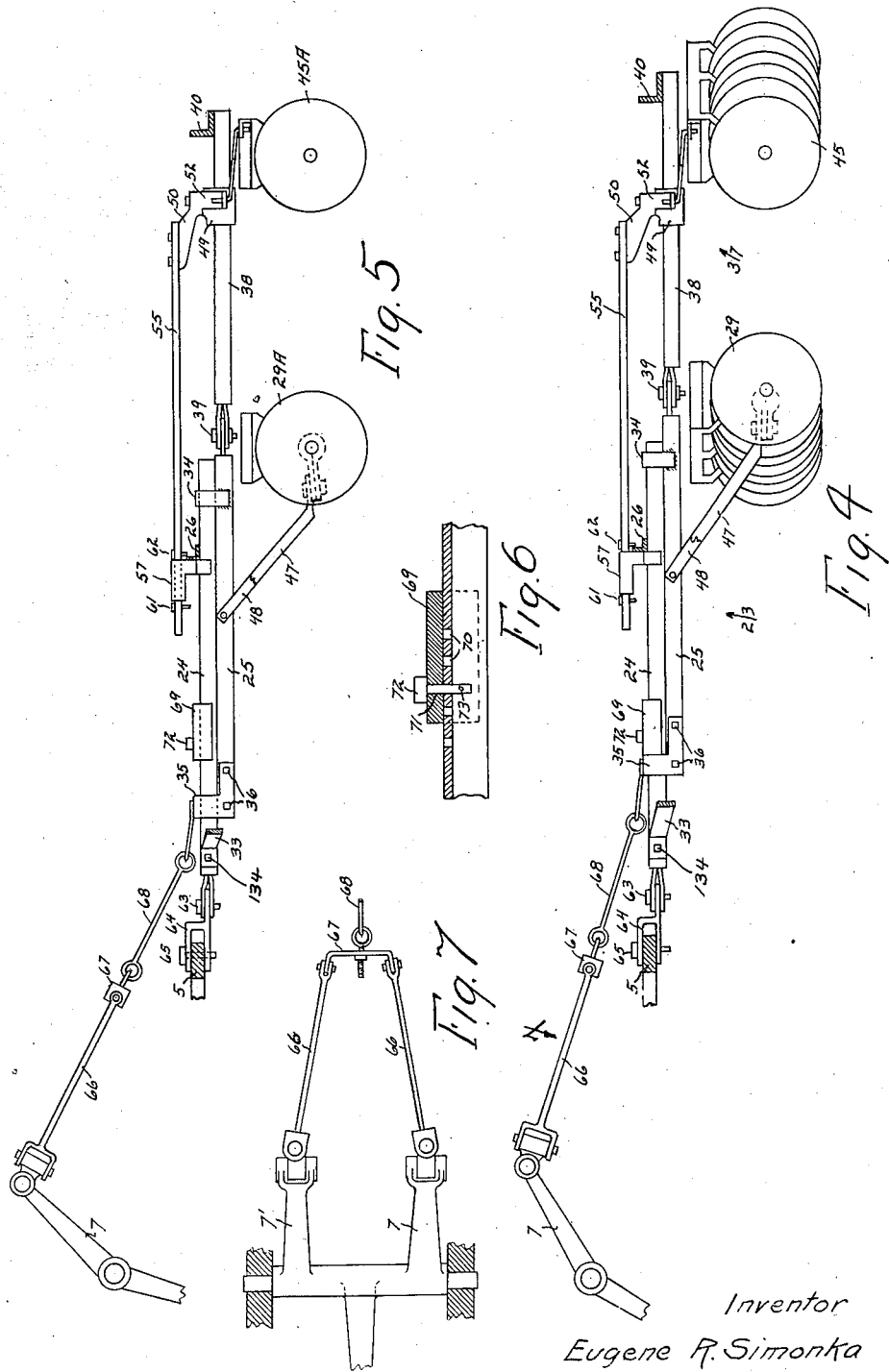

Patented Mar. 7, 1944

2,343,482

UNITED STATES PATENT OFFICE 2,343,482

TRACTOR OPERATED DISK HARROW

Eugene R. Simonka, Brecksville, Ohio, assignor to Dunham Company, Berea, Ohio, a corporation of Ohio Application June 22, 1942, Serial No. 447,921

11 Claims. (Cl. 55—83)

This invention relates to agricultural tillage implements of the disk harrow type; and to such implements as are constructed to be propelled as a unit and also adjusted by the power of a tractor.

As is well-known, disk harrows comprise, in general, gangs of rotary disks mounted for horizontal pivoting movement on a frame, by which the soil working angle of the disks relative to the forward direction of travel may be changed; and mechanism to adjust the said working angle in accordance with soil conditions, or to set the disks so as to be substantially without working angle when traveling toward and from the field to be worked, or when making turns at the end of the field, etc.

It is known practice to construct agricultural implement tractors so as to provide not only forward propulsion draft for the implement as a whole, but also to provide an auxiliary power take-off for various purposes, such as to raise or lower the implement with respect to the soil or to adjust the soil-working elements of the implement; and according to the present invention I provide an improved disk harrow arranged to be propelled by such a tractor and arranged to be operated in an improved manner by the auxiliary power take-off of the tractor to adjust the working angle of the disks with respect to the soil.

The disk gangs of the harrow herein to be described are mounted on a frame so that when the forward draft of the tractor is applied to the implement to propel it, the disks automatically turn to a predetermined soil working angle, this being effected by a suitable location of the gang pivots, and by the drag of the disks when propelled forwardly; and mechanism is provided associated with the aforesaid auxiliary power take-off of the tractor and subject to manual control by which the disk gangs may be turned to a lesser angle or to zero angle at any time during forward propulsion of the implement as a whole, and by which the gangs may be released from the auxiliary power take-off and permitted to return automatically to their predetermined working angle by the forward draft of the implement.

While my invention has particular advantages when applied to a disk harrow comprising two forward disk gangs and two rearward disk gangs, it may be practiced in some of its aspects with one forward gang alone or with two forward gangs alone or with one forward and one rearward gang.

It is among the objects of the present invention:

To provide generally an improved agricultural implement of the disk harrow type;

To provide an agricultural implement of the disk harrow type having improved means for moving the disk gangs thereof to desired angular positions relative to the direction of travel;

To provide an agricultural implement of the disk harrow type provided with improved means operable by the power of a tractor to propel the implement over the ground and also to change the angle of the disks with respect to the direction of travel;

To provide an agricultural implement of the disk harrow type having gangs of disks pivotally mounted so that upon forward propulsion of the implement by a tractor they tend to take up positions which dispose the disks at an angle to the direction of travel and having means associated therewith by which, during the propulsion of the implement over the ground, auxiliary power of the tractor may be optionally used to move the disk gangs to dispose the disks thereof substantially without angle;

To provide an agricultural implement of the disk harrow type provided with a main hitch for connection to the main draft point of a tractor and provided with an auxiliary hitch adapted to be connected to an auxiliary source of power on the tractor; and the implement comprising pivoted gangs or disks pivotally movable to angle ground working position or to no-angle non-working position; and the mechanism being constructed so that the disk gangs tend automatically to move to one of said positions when the implement is propelled along the ground by the main hitch; and auxiliary power supplied to the auxiliary hitch being utilized to move the gangs to the other position;

To provide in an implement of the type referred to above, improved means for preselecting the ground working angle to which the gangs of disks move.

Other objects will be apparent to those skilled in the art to which my invention appertains. My invention is fully disclosed in the following description taken in connection with the accompanying drawings in which, Fig. 1 is a view in some respects diagrammatic of a tractor of the type by which the implement embodying part of my invention may be operated and having an auxiliary power unit thereon;

Fig. 4 is a side elevational view of the harrow of Fig. 2 and illustrating besides the main draft hitch connection, the hitch connection to the auxiliary power take-off of the tractor by which the angle of the disk gangs may be changed, the disks in this figure being illustrated in the ground working angular position;

Fig. 5 is a view similar to Fig. 4 with the disk gangs thereof in no-angle or non-ground working positions;

Figure 2:
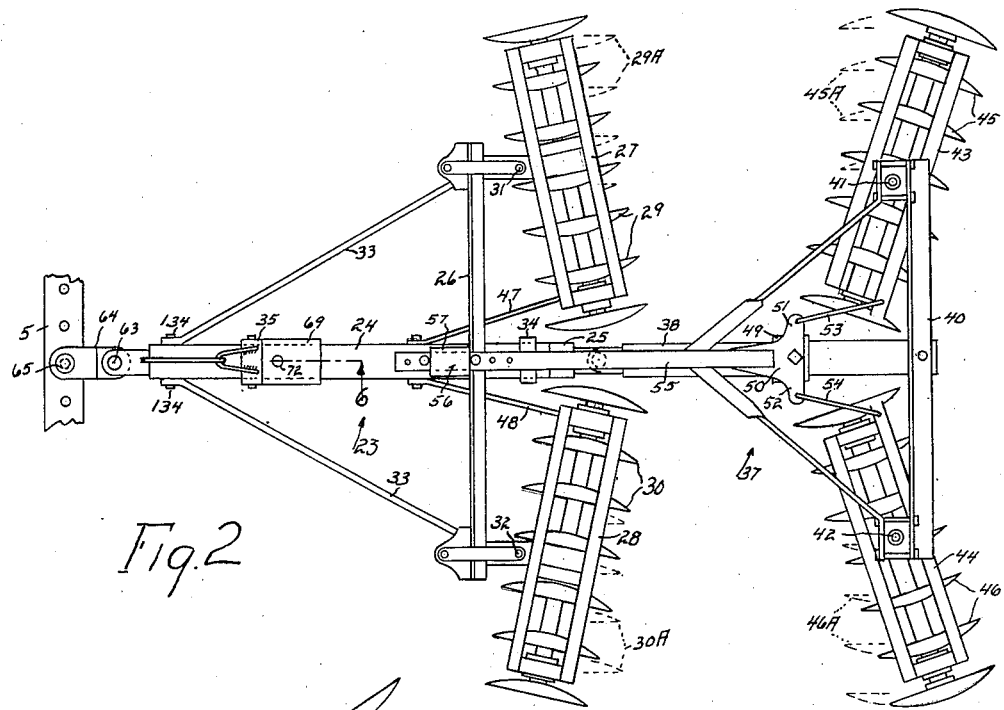
Fig. 2 is a top plan view of a tandem disk harrow embodying a part of my invention and illustrating means for hitching it to the tractor of Fig. 1 a part of the hitch being broken away, and showing the positions which the parts assume when the harrow is being propelled in a straight-ahead line of direction.

Fig. 6 is a fragmentary view illustrating to enlarged scale a part of the implement of Figs. 2, 4, and 5 and the view may be considered as showing in section parts which are illustrated in elevation in Figs. 4 and 5; or it may be considered as taken from the plane 6 of Fig. 2;

Fig. 7 is a fragmentary view taken from the plane 7 of Fig. 4;

Fig. 8 is a fragmentary view illustrating a part of Fig. 2 to enlarged scale;

Fig. 9 is a sectional view taken from the plane 9—9 of Fig. 8;

Fig. 10 is a view illustrating the forward part of the implement of Fig. 4 in connection with a modification of the main draft hitch; and a modification of the means for adjusting the disk angle;

Fig. 11 is a top plan view of the parts of Fig. 10;

Fig. 12 is a fragmentary view taken from the plane 12 of Fig. 10.

Referring to the drawings Fig. 1 I have illustrated therein in diagrammatic form a tractor of the type with which the implement of my invention may be advantageously associated. At 1 generally is the main frame, at 2 the forward wheels and at 3 the rearward or traction wheels, only one of which is shown, and at 4 a driver's seat supported on the frame. A transverse draft bar 5 is connected to the main frame. At 6 is a shaft rotatable on the main frame and on which is oscillatably mounted a bell crank having bell crank arms 7 and 8, the arm 7 being in the form of a pair of arms 7 and 7' laterally spaced apart and shown in Fig. 7 to be referred to. The engine indicated at 9 transmits power to the rear wheels by the usual transmission not shown.

A hydraulic cylinder 10 is mounted on the main frame and has a piston 11 connected by a piston rod 12 to the arm 8 whereby reciprocations of the piston will oscillate the bell crank arms 8 and 7—7'. Liquid such as oil to move the piston 11 is supplied by a pressure pump indicated at 13 connected by a pressure line 14 to a reservoir 15. A manually operable valve 16 having a handle 17 to operate it is provided adjacent the driver's seat 4 and this valve may be of any well-known or suitable construction having the following mode of operation. When the handle is moved in one direction, liquid under pressure from the reservoir 15 flows by a line 18 through the valve and by a line 19 to the cylinder 10 and propels the piston 11 forward. When the handle 17 is moved in the other direction liquid from the cylinder 10 exhausts by the line 19 through the valve to a line 20 and thence to a sump 21 from which it may be pumped back by the pump 13 through a return line 22. Any suitable or known means not shown may be provided to prevent the pump from developing pressure above a desired maximum value.

Upon thus admitting pressure to the cylinder 10, the bell crank arms 7—7' will move counterclockwise, as viewed in Fig. 1, a predetermined amount as will become clear and upon relieving the cylinder pressure by the valve draft on the arms 7—7' will return the piston to its original position.

The above described tractor and hydraulic auxiliary power unit including the oscillatory shaft 6, etc. constitute no essential part of the present invention and these parts may be variously constructed. For example all of the parts of the auxiliary unit rearwardly of the reservoir 15 may be mounted on the end of the implement itself to be described; and the auxiliary power unit has herein been shown in diagrammatic form as being illustrative of any construction and disposition of said parts; and in the other figures of the drawings, in which I have illustrated an agricultural implement of the disk harrow type which may be operated by such a tractor and power unit, I have for the sake of simplicity in the drawings illustrated only the draw bar 5 and the supplemental draft elements 6, 7—7', and 8 and the parts connected thereto.

Referring now to the other figures of the drawings, I have illustrated generally at 23 a forward main frame comprising a longitudinal beam 24 and a stub beam or supplemental frame member 25 thereunder, and slidable thereon or relative thereto, by means to be described.

Secured to the longitudinal beam 24 is a transverse angle frame element 26, upon the opposite lateral ends of which are supported disk gang frames 27 and 28 rotatably supporting gangs of discs 29 and 30 respectively, the gang frames 27 and 28 being pivotally supported as at 31 and 32 so as to swing in horizontal planes either to the ground working angle position of Figs. 2 and 4 or to the no-angle, non-working position shown in Fig. 5 and shown in Fig. 2 in dotted line at 29A and 30A. The transverse angle member 26 is braced by braces 33—33 associated with the outer ends of the angle member 26 and extending forwardly convergingly and secured as at 134 to the longitudinal beam 24, the forward frame 23 thus being generally of angle configuration for rigidity.

As mentioned, the stub beam 25 and the longitudinal beam 24 of the forward frame are mounted to slide relatively, one with respect to the other and this may be conveniently provided by means of U-form loops of metal 34 and 35; the loop 34 straddling the longitudinal beam 24 and being welded to opposite sides of the stub beam 25, see Figs. 2 and 4, and the loop 35 similarly straddling the loop 24 and being secured to the stub beam 25 thereunder by bolts 36, see Figs. 2 and 4.

The implement comprises also a rear frame shown generally at 37 and comprising a longitudinal beam 38 pivotally connected at its forward end by a king pin 39 to the rearward end of the stub beam 25. At the rearward end of the beam 38 is a transverse angle bar 40 at the outer opposite ends of which are pivotally supported, on pivots at 41 and 42, a pair of rearward gang frames 43 and 44 rotatably supporting gangs of disks 45 and 46 which may occupy ground-working angular positions as shown in Fig. 4 and in solid line in Fig. 2 or may be moved to no-angle non-working positions as shown in Fig. 5 and as indicated in dotted line at 45A and 46A in Fig. 2.

As will be observed in Fig. 2 the pivot connections 31—32 are nearer to the outer lateral ends of the forward gang frames 27 and 28 than to the inner ends, and the pivot connections 41 and 42 for the rearward gang frames 43 and 44 are nearer to their inner adjacent ends than to their laterally opposite outer ends, so that, as the implement as a whole, including the gang frames, is propelled forwardly, the drag of the soil on the disks causes the said gang frames to rotate on their pivots and to take up angular ground working positions such as those shown for example in Fig. 2. By means which will now be described, the angle to which the disks move in this manner may be adjustably predetermined or preselected; and also, by which they may when desired be rotated to the no-angle non-working position for the purposes referred to.

Inner end portions of the forward gang frames 27 and 28 are connected by bars or tie members 47—48 to the stub bar 25, Figs. 2, 4 and 5. From an inspection of Figs. 2, 4 and 5 it will be apparent therefore that if the stub bar 25 moves forwardly relative to the longitudinal frame element 24 on which it slides, its movement will be communicated to the forward gang frames through the bars 47 and 48 and rock or pivot them to the no-angle position; and that if the stub bar 25 be free to move in the rearward direction, it will allow the forward gang frames to move to the angle position.

As to the rearward gang frames, there is slidably mounted upon the longitudinal beam 38 a slider 49 upon which is oscillatably mounted a head 50 having oppositely laterally ending arms 51 and 52 connected by bars 53 and 54 to the inner ends of the rearward gang frames 43 and 44 respectively; and the head 50 has secured thereto a bar 55 which extends forwardly beyond the pivot 39 and is pivotally connected to the longitudinal bar 24 of the forward frame as shown generally at 56.

This pivot connection may be variously constructed, one suitable construction being shown separately in Figs. 8 and 9. A tubular head 57 is telescoped over the bar 55 and is provided with an oscillatory or pivot bearing as shown at 58, supported by a support 59 secured to the bar 24. A number of holes 60—60 are preferably provided in the bar 55, and pins such as those shown at 61—62 are provided which may be placed in the holes 60—60 at the forward and rearward terminations of the tubular head 57. The bar 55 is thus connected to the head 57 by the pins 61—62 and its longitudinal position therein can be adjusted for a purpose to be referred to by placing the said pins in other pairs of holes.

With the construction above-described, if as referred to, the stub bar 25 is moved forwardly relative to the forward frame bar 24, the pivot 39 and the rear frame bar 38 move forwardly with it; and the forward end of the bar 55 being connected to the frame bar 24, the rear frame bar 38 moves forwardly relative to the head 50 and relative to arms 51 and 52, so that the rear gang frame pivots 41 and 42 move forwardly, and through the agency of the bars 53 and 54 the rear frames are rocked to no-angle position; similarly and conversely, if the stub bar 25 be allowed to move rearwardly, the rear gangs, as in the case of the forward gangs, will move to the ground working angle position as described.

The aforesaid bar 55, its pivot connection with the forward gang frame, its sliding connection with the rearward main frame and its pivot connection with the rear frame, perform another function which is not an essential feature of the present invention, namely, when the implement as a whole is drawn forwardly on a curved line of direction, the gang frames are given a supplemental pivoting movement which causes them to maintain substantially the same ground working angle with respect to the curved direction of movement, as when the implement is moving forwardly in a rectilinear line of direction.

Figure 3:
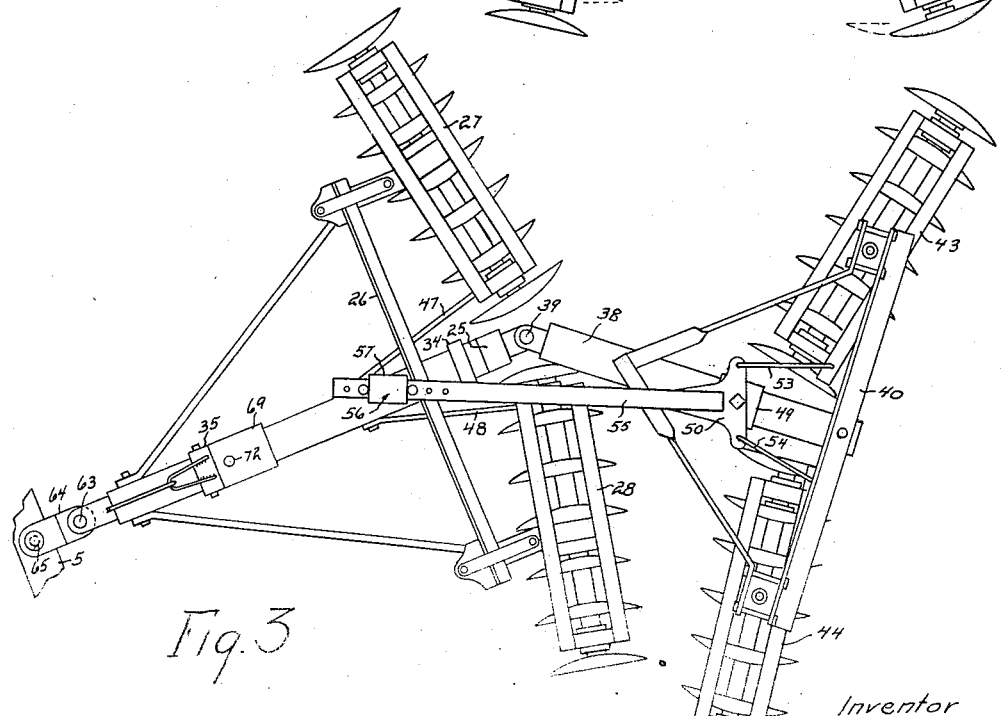
Fig. 3 is a view similar to Fig. 2 but with parts thereof in positions which they assume when the harrow is being propelled along a curved line of direction.

This supplemental pivoting movement is given principally to the rearward gang frames and is apparent in going from Figs. 2 to 3; and the same is more fully described in the co-pending application of Harold R. McVicar, Serial No. 345,565, filed July 15, 1940, to which reference may be had, and which has the same assignee as the present application.

The longitudinal bar 24 of the forward main frame 23 is connected by a king pin type of hitch, shown at 63, with a clevis 64 which in turn is connected by a king pin 65 to the draft bar 5 of the tractor. The clevis 64 and the draft bar 5 as will be apparent support the forward end of the implement as well as serving to propel it as a whole, and the clevis 64 may be formed to support the forward end at any desired suitable height from the ground regardless of the height from the ground of the draft bar 5; and the clevis 64 may be of any longitudinal extent between the king pin connections 65 and 63 whereby the tractor and the implement may be operated upon turns of small radius. This king pin connection permits the implement to swing from side to side freely in following the tractor and, as in such king pin connections generally, there is sufficient looseness or lost motion to permit the implement to rock on a longitudinal axis so that the disks maintain their contact with the soil and their working depth therein on uneven ground.

As shown in Figs. 4, 5 and 7, the above-mentioned arms 7 and 7' of the auxiliary power take-off are connected by links or bars 66—66 to a yoke 67 to which is connected a link or flexible chain 68 one end of which is connected to the above-described U-form member 35 secured to the stub bar 25 and the other end of which is longitudinally adjustably connected, as shown in Fig. 7, to the yoke 67.

By this arrangement it will now be apparent that when the arms 7—7' are rocked in the counter-clockwise direction as viewed in the drawings, and from the position shown in Fig. 4 to that shown in Fig. 5, the stub bar 25 will thereby moved forwardly relative to the main frame longitudinal bar 24 and the disks of both the forward and rearward gangs will be moved to a no-angle non-working position for the purposes described; and that when the arms 7—7' are released by control of the power take-off, the drag of the disks with the soil will cause them and the stub bar 25 to which they are connected to lag behind the forward movement of the main frame bar 24 and the disks will move to a ground working angle position; and the angle to which they move may be adjustably preselected by the following means.

Upon the longitudinal bar 24 and rearwardly of the U-shaped member 35 is a saddle 69 which may conveniently be of channel form, see Figs. 4, 5 and 6. A series of holes 70—70 are provided in the longitudinal bar, and a hole 71 is provided in the saddle. The saddle may be adjustably positioned along the bar by a bolt 72 projected through the hole 71 and one of the holes 70, and retained from being accidentally displaced by a cotter pin 73 or like means.

When the stub bar 25 slides rearwardly as described, the U-shaped member 35 abuts upon the saddle 69 as shown in Fig. 4 and stops the movement with the disks in an angle determined by the selection of the hole 70 for the bolt 72.

In Figs. 10, 11 and 12 is shown another construction for preselecting the working angle to which the disks move, and this construction will be preferred in cases in which, for convenience, it is desired that the adjustment be made by the driver of the tractor while on the tractor seat; and in these figures is shown also another type of main draft connection between the implement and the tractor.

A pair of bars 74 and 75 secured to the under side of the rear axle 76 extend rearwardly therefrom and at their outer ends are braced by braces 77—77 extending upwardly and connected to an upper portion of the tractor structure not shown; and the rearward ends of the bars 74—75 are connected by the aforesaid draft bar 5 having king pin holes 78 therein. When the hereinbefore-described construction of main hitch is wanted, the king pin connection may be made at one of these holes 78, but in the draft arrangement now to be described these holes are not used.

The bars 74—75 are also connected by a transverse tie member 79 detachably connected to the bar 74—75 by bolts 80—80. On its forward side it has mounted thereon a loop or eye 180 for a purpose to be described. A draw bar 81 has a king pin connection at 82 with the tie member 79 see Fig. 10; and the draw bar 81 extends rearwardly under the draft bar 5; and inasmuch as the king pin connection 82 is forwardly of the draft bar 5 the draw bar 81 will, in swinging on its king pin, move laterally with respect to the draft bar 5, and accordingly it is supported thereon by a roller 83 above the draft bar 5 and rotating on a bolt 94 carried by the draw bar 81 on brackets 84—84. At the rearward end of the draw bar 81 is the above-described king pin 63 to which the longitudinal bar 24 of the implement is connected. The implement may thus swing from side to side around the king pin 63 as well as around the king pin 82 and the tractor and the implement may thus make turns of short radius.

Upon the upper side of the tie member 79 is a bracket bridging the king pin 82, and an upwardly extending tongue 86 is hinged to the bracket by a bolt 87. As shown in Fig. 10, the tongue 86 is preferably curved edgewise, in general rearwardly convex, and is free to hingingly move forwardly until an upper portion thereof rests upon an adjacent portion of the tractor structure indicated at 88. The rearward edge of the tongue 86 is provided with a series of notches 89. The above-described U-shaped member 35 slidingly supporting the stub bar 25 is provided in this case with a downward extension 90 and to this extension is connected a rod 91, the forward end of which terminates in a chain 92. The chain 92 bends around the tie member 79 and extends upwardly through and is guided and retained by the above-described loop or eye 180 and then extends in general vertically and the uppermost link or eye thereof is telescoped over the tongue 86 and lodged in one of the notches 89.

When as described, the tension in the link 68 is relieved by releasing the auxiliary power take-off, and the longitudinal bar 24 moves forwardly with respect to the stub bar 25, the relative movement of the stub bar 25 is stopped when the rod 91 and the chain 92 become taut and this limits or determines, as will be understood, the angling of the disks at a preselected angle determined by which one of the notches 89 the uppermost link or eye of the chain 92 is lodged in.

On the other hand when tension is put in the link 68 by the auxiliary power take-off and the stub bar 25 is drawn forwardly as described thereby releasing tension in the rod 91 and the chain 92, the uppermost link of the chain may at this time if desired be removed from its notch and lodged in another notch which will adjust or change the angle to which the disk gangs move as will now be understood.

By the arrangement above described and in cases in which the tractor seat 4, as illustrated in Fig. 10, is near a vertical plane through the rear axle, the driver of the tractor while sitting on the seat may reach down and grasp the uppermost link or eye 93 of the chain and adjust it to one or the other of the notches 89 for the purposes described.

It will be observed that, although the chain is secured to the tongue 86 at a point above the line of draft, the chain bends around the tie member 79, and the rod 91 which is a continuation thereof, extends generally from the tie member 79, so that the line of draft to propel the implement by the king pin 82, and the line of draft by which the disks are held at their ground working angle, are both substantially horizontal and on the level of the tie member 79 which may, as shown, be below the rear axle for well-known desirable purposes.

As described, the tongue 86, the tie member 79 to which it is hinged, the draw bar 81, the chain 92 and rod 91 may all be removed as a unit upon detaching the tie member 79, the roller 83 being removable by moving the bolt 94 upon which it rotates; so that the said parts may be removed as a unit together with the implement, or replaced as a unit, when it is desired to change from the disk harrow implement to another kind, and vice versa.

It will be observed also that when the tractor and the harrow are being propelled on a curved line of direction and the harrow swings toward one side or the other, the main draft point on the tractor is at the middle of the tie member 79, and concurrently therewith the draft point to hold the disks at their working angle is also at the middle of the tie member 79, so that the disk will be maintained at substantially the same working angle on curved directions of travel as on straight ahead directions.

Also it will be observed that whether the implement is being propelled in a straight or in a curved direction, the tractor draft is applied at the aforesaid advantageously located middle of the tie member 79, whether it be considered as draft to propel the implement frames or as draft to hold the disks at their ground working angle, or both.

The mechanical principles and mode of operation of the implement above-described, and its hitch connections with the tractor, may be embodied in apparatus different from that illustrated and described; and my invention is therefore not limited to the exact details of construction illustrated and described. Changes and modifications may accordingly be made within the spirit of my invention without sacrificing its advantages; and my invention comprehends all such changes and modifications which come within the scope of the appended claims.

I claim:

1. In a tandem disk harrow implement, a forward main frame and a rearward main frame each pivotally supporting a pair of disk gangs so as to swing into ground-working and non-working angle positions; and the pivotal supports being disposed so that upon forward propulsion of the implement the disk gangs turn into ground working angle positions; a hitch on the forward frame for connection to a main draft point of a tractor to propel the implement and on which the implement may swing from side to side; a supplemental frame member mounted to have forward and rearward movement relative to the forward frame, and the rear frame having a king pin connection with the supplemental frame member to move forwardly and rearwardly therewith and to swing from side to side relative thereto; a hitch associated with the supplemental frame member for connection to an auxiliary draft point of the tractor; connections between the rear gangs and the forward frame bridging the king pin connection, and connections between the forward gangs and the supplemental frame member, whereby when the supplemental frame member and rear frame are moved forwardly relative to the forward frame by auxiliary draft, the gangs are pivotally moved to non-working angle position; and whereby upon release of the auxiliary draft the forward frame moves forwardly relative to the supplemental frame and rear frame and the gangs pivotally move to angle working position.

2. In a tandem disk harrow implement, a forward main frame and a rearward main frame each pivotally supporting a pair of disk gangs so as to swing into ground-working and non-working angle positions; and the pivotal supports being disposed so that upon forward propulsion of the implement the disk gangs turn into ground working angle positions; a hitch on the forward frame for connection to a main draft point of a tractor to propel the implement and on which the implement may swing from side to side; a supplemental frame member mounted to have forward and rearward movement relative to the forward frame, and the rear frame having a king pin connection with the supplemental frame member to move forwardly and rearwardly therewith and to swing from side to side relative thereto; a hitch associated with the supplemental frame member for connection to an auxiliary draft point of the tractor; connections between the rear gangs and the forward frame bridging the king pin connection, and connections between the forward gangs and the supplemental frame member, whereby when the supplemental frame member and rear frame are moved forwardly relative to the forward frame by auxiliary draft, the gangs are pivotally moved to non-working angle position; and whereby upon release of the auxiliary draft the forward frame moves forwardly relative to the supplemental frame and rear frame and the gangs pivotally move to angle working position, and adjustable means to limit forward movement of the forward frame relative to the supplemental frame member and rear frame, for pre-selecting the ground working angle to which the gangs pivotally move.

3. In a tandem disk harrow, a forward main frame and a rearward main frame each frame pivotally supporting a pair of disk gangs so as to swing into ground-working and non-working angle positions; and the pivotal supports being disposed to cause the disk gangs to move to ground-working angle positions upon forward propulsion of the implement; a hitch on the forward frame for connection to a main draft point of a tractor to propel the implement; a supplemental frame member mounted to have forward and rearward movement relative to the forward frame, and the rear frame being connected with the supplemental frame member to move forwardly and rearwardly therewith and having a king pin connection therewith on which it may swing from side to side relative thereto; a hitch associated with the supplemental frame member for connection to an auxiliary draft point of the tractor; connections between the rear gangs and the forward frame comprising a longitudinally movable element on the rear frame and a bar connected thereto bridging the king pin connection of the rear frame and pivotally connected to the forward frame forwardly of said king pin connection; and tie member connections between the forward gangs and the supplemental frame member; said connections being arranged so that when the supplemental frame member and rear frame are moved forwardly relative to the forward frame by auxiliary draft, the gangs are pivotally moved to non-working angle position and whereby upon release of the auxiliary draft the forward frame moves forwardly relative to the supplemental frame and rear frame, and the gangs pivotally move to angle-working positions.

4. In a tandem disk harrow, a forward main frame and a rearward main frame each frame pivotally supporting a pair of disk gangs so as to swing into ground-working and non-working angle positions; and the pivotal supports being disposed to cause the disk gangs to move to ground-working angle positions upon forward propulsion of the implement; a hitch on the forward frame for connection to a main draft point of a tractor to propel the implement; a supplemental frame member mounted to have forward and rearward movement relative to the forward frame, and the rear frame being connected with the supplemental frame member to move forwardly and rearwardly therewith and having a king pin connection therewith on which it may swing from side to side relative thereto; a hitch associated with the supplemental frame member for connection to an auxiliary draft point of the tractor; connections between the rear gangs and the forward frame comprising a longitudinally movable element on the rear frame and a bar connected thereto bridging the king pin connection of the rear frame and pivotally connected to the forward frame forwardly of said king pin connection; and tie member connections between the forward gangs and the supplemental frame member; said connections being arranged so that when the supplemental frame member and rear frame are moved forwardly relative to the forward frame by auxiliary draft, the gangs are pivotally moved to non-working angle position and whereby upon release of the auxiliary draft the forward frame moves forwardly relative to the supplemental frame and rear frame, and the gangs pivotally move to angle-working positions; and adjustable stop means to stop rearward movement of the supplemental frame member and rear frame to pre-select the angle to which the gangs move.

5. In a tandem disk harrow implement, a forward main frame and a rearward main frame each frame pivotally supporting a pair of disk gangs so as to swing into ground working and non-working angle positions; a hitch on the forward frame for connection to a main draft point of a tractor to propel the implement; a supplemental frame member supported on the forward frame and guided to have forward and rearward movement relative to the forward frame, and the rear frame being connected with the supplemental frame member to move forwardly and rearwardly therewith; a hitch associated with the supplemental frame member for connection to an auxiliary draft point of the tractor; connections between the rear gangs and the forward frame and connections between the forward gangs and the supplemental frame member whereby when the supplemental frame member and rear frame are moved forwardly relative to the forward frame by auxiliary draft, the gangs are pivotally moved to non-working angle position; and whereby upon release of the auxiliary draft the forward frame moves forwardly relative to the supplemental frame and rear frame, and the gangs pivotally move to angle working positions; and adjusting means to adjustably pre-select the angle to which the disk gangs move comprising a flexible element connected to the supplemental frame element extending forwardly therefrom and bent upwardly over a frame element of the tractor at a point adjacent the said main draft point of the tractor and terminating in an eye; and an upwardly extending tongue on the tractor telescoped through the eye, and a series of recesses on the tongue selectively engageable by the eye.

6. In a tandem disk harrow implement, a forward main frame and a rearward main frame each frame pivotally supporting a pair of disk gangs so as to swing into ground working and non-working angle positions; a hitch on the forward frame for connection to a main draft point of a tractor to propel the implement; a supplemental frame member supported on the forward frame and guided to have forward and rearward movement relative to the forward frame, and the rear frame being connected with the supplemental frame member to move forwardly and rearwardly therewith; a hitch associated with the supplemental frame member for connection to an auxiliary draft point of the tractor; connections between the rear gangs and the forward frame and connections between the forward gangs and the supplemental frame member whereby when the supplemental frame member and rear frame are moved forwardly relative to the forward frame by auxiliary draft, the gangs are pivotally moved to non-working angle position; and whereby upon release of the auxiliary draft the forward frame moves forwardly relative to the supplemental frame and rear frame, and the gangs pivotally move to angle working positions; and adjusting means to adjustably pre-select the angle to which the disk gangs move comprising a flexible element connected to the supplemental frame element extending forwardly therefrom and bent upwardly over a frame element of the tractor and terminating in an eye; and an upwardly extending tongue on the tractor telescoped through the eye, and a series of recesses on the tongue selectively engageable by the eye.

7. In a disk harrow implement, a main frame pivotally supporting a pair of disk gangs so as to swing into ground-working angle positions upon propulsion of the implement; a hitch on the frame for connection to a main draft point of a tractor to propel the implement; a supplemental frame member supported by the forward frame member and guided to have forward and rearward movement relative to the frame; a hitch associated with the supplemental frame member for connection to an auxiliary draft point of the tractor; connections between the gangs and the frame whereby when the supplemental frame member is moved forwardly relative to the forward frame by auxiliary draft the gangs are pivotally moved to non-working angle position and whereby upon release of the auxiliary draft the forward frame moves forwardly relative to the supplemental frame member and the gangs pivotally move to angle-working position; and adjustable means to limit rearward movement of the supplemental frame member to selectively determine the ground working angle to which the disk gangs move, comprising a flexible element connected to the supplemental frame element extending forwardly therefrom and bent upwardly over a frame element of the tractor and terminating in an eye, and an upwardly extending tongue on the tractor telescoped through the eye and a series of recesses on the tongue selectively engageable by the eye.

8. In a disk harrow implement, a main frame pivotally supporting a pair of disk gangs so as to swing into ground-working angle positions upon propulsion of the implement; a hitch on the frame for connection to a main draft point of a tractor to propel the implement; a supplemental frame member supported by the forward frame member and guided to have forward and rearward movement relative to the frame; a hitch associated with the supplemental frame member for connection to an auxiliary draft point of the tractor; connections between the gangs and the frame whereby when the supplemental frame member is moved forwardly relative to the forward frame by auxiliary draft the gangs are pivotally moved to non-working angle position and whereby upon release of the auxiliary draft the forward frame moves forwardly relative to the supplemental frame member and the gangs pivotally move to angle-working position; and adjustable means to limit rearward movement of the supplemental frame member to selectively determine the ground working angle to which the disk gangs move, comprising a flexible element connected to the supplemental frame element and extending forwardly therefrom and reacting upon the tractor substantially at the said main draft point of the tractor, and means to adjust the effective length of the flexible element.

9. In a disk harrow implement, a main frame pivotally supporting a pair of disk gangs so as to swing into ground working angle positions, upon forward propulsion of the implement, forwardly and rearwardly movable means associated with the main frame to move the disk gangs to substantially non-working angle positions upon forward movement and to allow them to move to working angle positions upon rearward movement of said means, three sets of connections extending forwardly from the implement, a first set to attach the main frame to the main draft point of a tractor for forward propulsion, a second set to attach the forwardly and rearwardly movable means to an auxiliary power take off of the tractor, and a third set to attach the forwardly and rearwardly movable means to the tractor to stop rearward movement thereof to determine the working disk gang angle.

10. In a disk harrow implement for propulsion by a tractor having an operator's seat, a main frame pivotally supporting a pair of disk gangs so as to swing into ground working angle positions, upon forward propulsion of the implement, forwardly and rearwardly movable means associated with the main frame to move the disk gangs to substantially non-working angle positions upon forward movement and to allow them to move to working angle positions upon rearward movement of said means, a first set of connections extending forwardly from the implement, to attach the main frame to the main draft point of the tractor for forward propulsion, a second set of connections extending forwardly from the implement to attach the forwardly and rearwardly movable means to an auxiliary power take off of the tractor, and an adjustable connection associated with the forwardly and rearwardly movable means and reacting upon the tractor to adjustably stop rearward movement of said means to adjustably determine the working disk gang angle, said adjustable connection being accessible to an operator of the tractor from the tractor seat.

11. In a disk harrow implement for propulsion by a tractor having an operator's seat, a main frame pivotally supporting a pair of disk gangs so as to swing into ground working angle positions, upon forward propulsion of the implement, forwardly and rearwardly movable means associated with the main frame to move the disk gangs to substantially non-working angle positions upon forward movement and to allow them to move to working angle positions upon rearward movement of said means, a first set of connections extending forwardly from the implement, to attach the main frame to the main draft point of the tractor for forward propulsion, a second set of connections extending forwardly from the implement to attach the forwardly and rearwardly movable means to an auxiliary power take off of the tractor, and adjustable stop means including a stop carried by the tractor to adjustably stop rearward movement of said rearwardly movable means to adjustably determine the working disk gang angle, said adjustable stop means being accessible to an operator of the tractor from the tractor seat.

EUGENE R. SIMONKA.